United States Patent [19]

Bergman et al.

[11] Patent Number: 4,893,685

[45] Date of Patent: Jan. 16, 1990

[54] SCALE

[75] Inventors: Donald A. Bergman, Roscoe; Robert A. O'Neil, Glen Ellyn, both of Ill.

[73] Assignee: Newell Co., Freeport, Ill.

[21] Appl. No.: 296,571

[22] Filed: Jan. 12, 1989

[51] Int. Cl.⁴ ............................................. G01G 23/14
[52] U.S. Cl. ............................. 177/174; 116/DIG. 32
[58] Field of Search ................ 177/173, 174, 256–259; 116/DIG. 32

[56] References Cited

U.S. PATENT DOCUMENTS 2,175,024  10/1939  Hansen ................................. 177/173
4,462,475   7/1984  Kushmuk .......................... 177/256 X Primary Examiner—George H. Miller, Jr.
Attorney, Agent, or Firm—James G. Staples; David I. Roche

[57] ABSTRACT

The scale of the present invention has a housing with a recess in its upper surface to allow rotative movement of a pointer therein. Numerals corresponding to weight are disposed an an annular disc-shaped dial carried by the upper periphery of the housing. A transparent cover plate overlies the recess in which the pointer rotates. The recess, pointer and dial are arranged and dimensioned so that the pointer and numerals can be easily read by a user from a standing position. The dial and cover are flush with the outer edge of the housing so that the entire upper surface of the scale is easy to clean and comfortable.

17 Claims, 1 Drawing Sheet

SCALE

BACKGROUND AND SUMMARY OF THE INVENTION

This invention relates to a device for measuring weight and, in particular, to a scale for measuring the body weight of a human in a standing position. Such scales are sometimes called bathroom scales.

Bathroom scales of the prior art generally include a rotating numbered dial, the periphery of which moves past a viewing window. The following are U.S. Patents which show typical rotating dials: 3,666,031 (Provi et al), 3,478,618 (Provi et al), and 3,460,642 (Provi et al). In these patents, the dial is moved rotationally by downward movement of the upper surface of the scale, relative to the base. A generally stationary indicator in the window marks a place on the moving dial corresponding to the weight applied to the scale. A system of levers, springs and a rack and pinion arrangement transfer downward load and movement into rotary movement of the numbered dial.

Rotating numbered dials are limiting in the sense that their diameters must fit and rotate freely within the scale's housing. The size of the numerals is therefore limited. For some users, particularly those with less than perfect eyesight, the numerals cannot be read while standing in an upright position. Problems with reading such scales can be made worse if the window becomes scratched, or if lighting is insufficient to extend down into the housing and onto the dial.

Attempts to solve this problem are exemplified in U.S. Pat. Nos. 3,469,645 (Provi et al) and 4,082,153 (Provi), wherein electronic means are employed to make the results of the weight measurement more readable. Such efforts generally result in significantly increased costs.

It is an object of the present invention to provide a simple and economical scale which allows a user to easily read the scale from a standing position.

Another object is to provide an easily readable scale which can utilize a standard internal scale mechanism.

Another object is to provide a scale which has a smooth upper surface which is comfortable to the feet of a user.

Another object is to provide a scale which is usable in a variety of angular positions.

Still another object is to provide a scale which is easy to keep clean.

These and other objects are achieved with a scale in which the housing has a central opening through which a shaft extends upwardly. The shaft rotates an indicator or pointer in proportion to weight applied to the scale. The pointer rotates within a covered recess in the upper surface of the housing. Around the cover, which is preferably a transparent plate, numerals are disposed The numerals are large and clearly visible so that reading of the scale from a standing position can be easily accomplished. The pointer, housing and cover are arranged so that the upper surface of the scale is a smooth flush surface which is both comfortable to the user's feet and easy to clean.

DETAILED DESCRIPTION OF THE DRAWINGS

The objects and advantages of the present invention will become apparent upon a reading of the following specifications, read in conjunction with the accompanying drawings wherein.

DETAILED DESCRIPTION OF THE INVENTION

Figure 1:
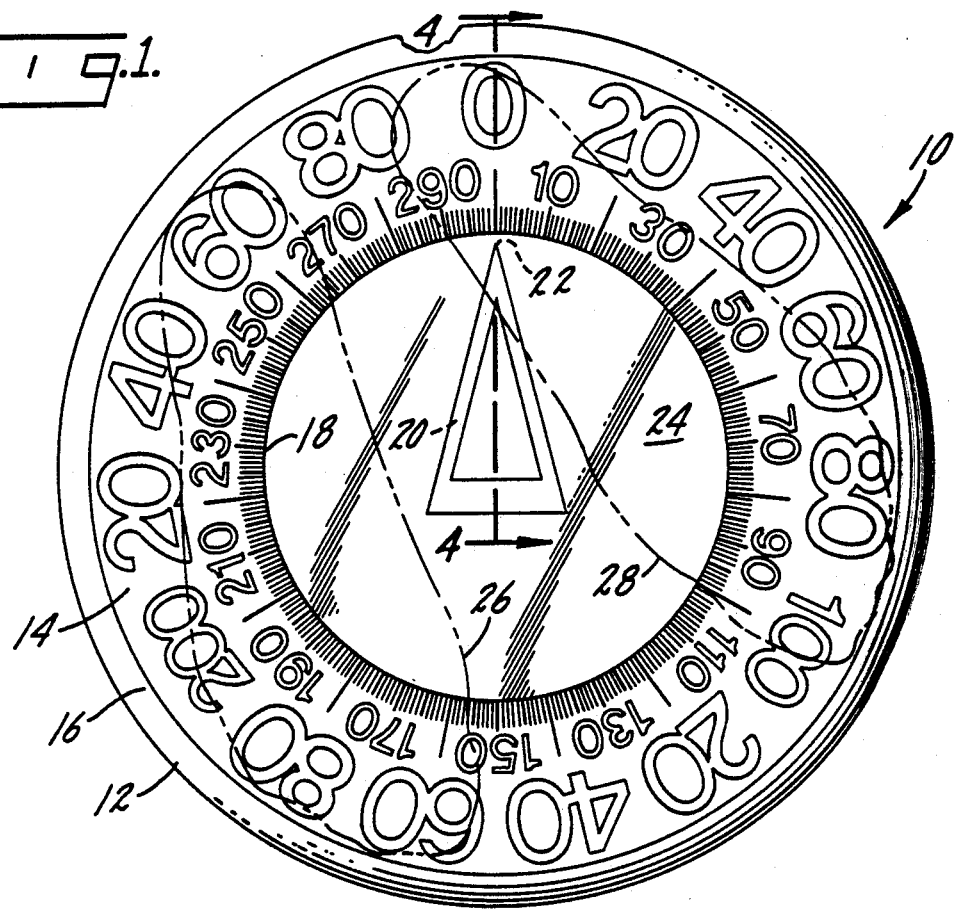
FIG. 1 is a plan view of a scale of the present invention.
Figure 2:
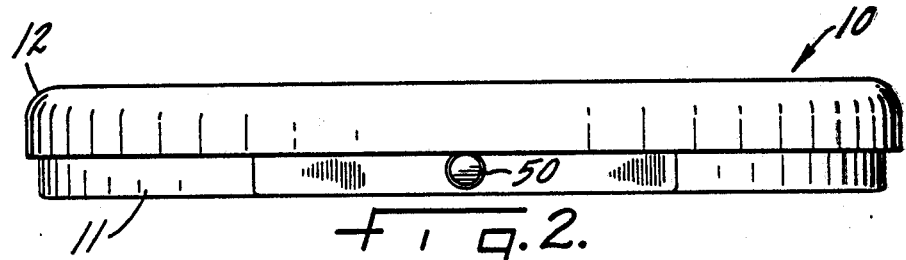
FIG. 2 is an elevational view from the top of FIG. 1
Figure 3:
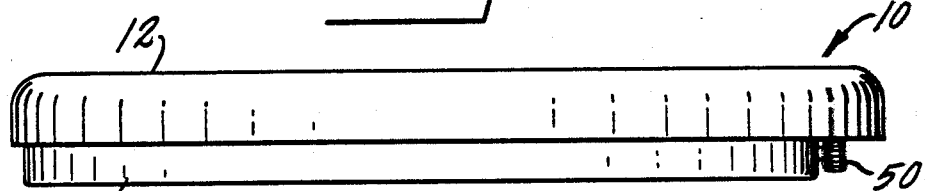
FIG. 3 is an elevational view from the right side of FIG. 1.

As shown in FIGS. 1, 2 and 3, the scale 10 is comprised of a generally circular housing 12 and base 11, and a numbered, annular dial 14 carried by the upper surface 16 of the housing 12. Single pound indicia 18 are on the inside of the dial. Twenty pound increments are spaced about the outside 21 and inside 23 of the ring or disc-shaped shaped dial 14. The indicator or pointer 20, carried by the base, has a tip 22 which points to appropriate pound indicia a various weights are applied to the scale.

A transparent support plate or cover 24 overlies the pointer and the upper surface thereof is generally co-planar with the upper surface of the dial 14. The feet 26 and 28 show how a user would use the scale 10. An opening between the front of the feet 26 and 28 represents the range in which the user's weight is expected to fall. Since most users will know the range in which their weight will fall, they can use the large, easily read numerals 21 and 23 to position their feet appropriately.

Figure 4:
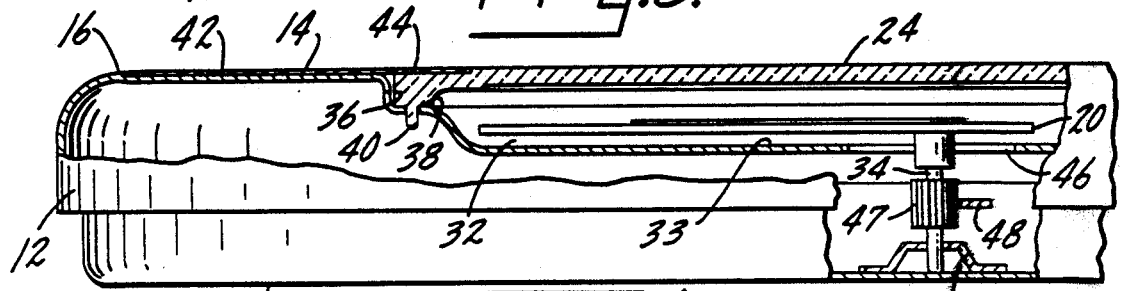
FIG. 4 is a partial sectional view taken along line 4—4 of FIG. 1.

FIG. 4 shows the elevational arrangement of the housing 12, the pointer 20, the cover 24, and the dial 14. The upper face 16 of the housing 12 includes a series of concentric recesses. A lower or deep recess 32 allows rotation of the pointer 20 and the shaft 34 to which it is connected.

A second recess 36 with shoulder 38 supports the cover 24. Apertures are located on the shoulder 38 to receive pins 40 molded into the cover 24. The pins 40 may be deformable, resiliently or plastically, to provide engagement between the cover 24 and the housing 12. The cover 24 is a clear plastic, to allow clear view of the pointer 20 in any position, and the cover has substantial thickness to provide support to a user.

A third recess 42 is shallow and receives the dial 14. The cover 24 has a step on its outer upper edge to receive the inner part of the dial 14. The depth of the step 44 is generally equal to both the dial thickness and the third recess 42, so that the entire upper surface of the scale is substantially smooth due to the flush arrangement of the various components. The flush upper surface of the scale is easy to keep clean and is comfortable for the user's feet. And, by providing the placement of the numerals on the upper outer surface of the scale, both space for and visibility of the numerals is maximized. The numerals may be printed onto the dial or adhesively applied thereto. The dial may be adhered with a mastic to the housing 12.

FIG. 4 clearly shows that the diameter of the recess 32, at the level of the pointer 20 is greater than the inside diameter of the dial 14. The advantage of this arrangement is that the pointer can rotate freely in the recess 32 while the tip 22 of the pointer is in vertical alignment with the inside edge of the dial 14. When viewed from above, the pointer will point to the various indicia 18 in a clear way because of the vertical alignment of the tip 22 and the dial 14, the radial extent of the pointer from the shaft 34 to the tip 22 being approximately equal to one half of the inside diameter of the dial 14.

The pointer 20 and shaft 34 are rigidly connected together to form an extension of a weighing mechanism (not shown). The shaft extends through an opening 46 in the housing 12. The rotation of the shaft 34 and the pointer 20 are proportional to the weight applied to the scale A scale mechanism of the type contemplated for use with this invention is shown in U.S. Pat. Nos. 3,666,031, 3,460,642 and 3,478,618, which patents are incorporated herein by reference. Rotation of the pointer 20 is similar to rotation of a dial on the scales shown in these patents.

FIG. 4 shows a shaft 34 with a splined pinion section 46 which is engaged by a rack 48. Axial movement of the rack 48 causes rotation of the pinion 47, the shaft 34, and thus the pointer 20. Axial movement of the rack 48 is caused by a series of levers (not shown). Four bell crank levers contact and engage brackets rigidly carried by the upper inside surface of the housing 12. As the housing 12 moves slightly downward, the bell crank levers transfer load to a pair of multiplication levers. The multiplication levers transfer thrust to a plate which carries the rack 48, and which is resisted by an adjustable main weighing spring. Adjustment of the main weighing spring is achieved by rotation of the adjusting knob 50 shown in FIGS. 2 and 3. The levers and spring are proportioned and designed such that movement of the pointer 20 relative to the dial 14 corresponds to weight applied to the scale.

Because there is a relative vertical movement between the housing 12 and the base 11, and because the pointer 20 is carried by the base 11 through the shaft 14 and shaft support 52, the recess 32 must have a vertical dimension sufficiently large to accommodate such vertical movement. Otherwise the pointer might strike the underside of the cover 24 or the bottom surface 33 of the recess 32.

While a specific embodiment of the invention has been shown and described, it will be apparent to those skilled in the art that numerous alternatives, modifications, and variations of the embodiment shown can be made without departing from the spirit and scope of the appended claims.

I claim:

1. A scale comprising a base, a housing, and means for measuring and indicating weight applied to said housing, said means including a rotating indicator and stationary indicia means carried by said housing having values corresponding to said weight,
   an upper surface of said housing including an opening for receiving a shaft to which said indicator is attached.

2. A scale in accordance with claim 1 wherein
   said upper surface has at least one first recess for receiving said indicator whereby weight applied to said upper surface does not interfere with said indicator.

3. A scale in accordance with claim 2 wherein
   a support spans said recess to provide a generally planar surface upon which to place said weight.

4. A scale in accordance with claim 3 wherein
   said support is a generally transparent continuous plate-like element.

5. A scale in accordance with claim 3 wherein said upper surface includes a second recess, larger in diameter than said recess for receiving said indicator, for receiving said support.

6. A scale in accordance with claim 2 wherein
   said indicia are carried by an annular disc drawing on inside and outside diameter, said first recess having a diameter at least as large as the inside diameter of said annular disc.

7. A scale in accordance with claim 6 wherein
   said upper surface has a third recess having a diameter corresponding to an outside diameter of said annular disc.

8. A scale in accordance with claim 6 wherein
   said annual disc is adhesively applied to said housing.

9. A scale comprising a base, a housing, and means for measuring and indicating weight applied to said housing, said means including a rotating indicator and stationary indicia means carried by said housing having values corresponding to said weight,
   said indicator being a pointer rotatable to a variety of rotational positions within a recess formed in an upper surface of said housing.

10. A scale in accordance with claim 9 including cover means for supporting said weight and bridging said recess while allowing said pointer to rotate within said recess, said cover means allowing view of said pointer from above while said pointer is in any of its rotational positions.

11. A scale in accordance with claim 10 wherein
    said pointer has a tip located at a radial distance from the center of said scale, said radial distance corresponding to about one half of the diameter of said annular disc, whereby said tip is generally in vertical alignment with an inside edge of said disc.

12. A scale comprising a base, a housing, means for measuring and indicating weight applied to an upper planar surface of said housing, the periphery of said upper planar surface being annular in shape and having indicia disposed thereon in an annular array, said housing having at least one central recess, an indicator disposed in said recess, movement of said indicator being proportional to weight applied to said housing, a cover spanning said recess, said cover providing means for supporting said weight, and said cover allowing view of said indicator by a user in a standing position.

13. A scale in accordance with claim 12 wherein
    said indicia are carried by an annular dial, said upper surface having a second outer recess for receiving said dial.

14. A scale in accordance with claim 13 wherein
    said cover has a shoulder formed on its upper outer periphery, said shoulder and said second recess each having a depth corresponding to the thickness of said dial, whereby said scale has a substantially smooth top.

15. A scale in accordance with claim 14 wherein
    said central recess has a diameter at least as large as the inside diameter of said annular disc.

16. A scale in accordance with claim 15 wherein
    said indicator has a radial extent approximately equal to one half of the inside diameter of said annular dial.

17. A scale in accordance with claim 16 wherein
    said housing and said base move relative to one another in proportion to weight applied to said scale, said central recess having a vertical dimension sufficient to prevent contact between said indicator and a bottom surface of said central recess, and between said indicator and said cover.

* * * * *